(12) United States Patent
Hayashida

(10) Patent No.: US 11,217,238 B2
(45) Date of Patent: Jan. 4, 2022

(54) INFORMATION PROCESSING DEVICE AND INFORMATION PROCESSING METHOD

(71) Applicant: Toyota Jidosha Kabushiki Kaisha, Toyota (JP)

(72) Inventor: Teruhide Hayashida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 16/262,131

(22) Filed: Jan. 30, 2019

(65) Prior Publication Data

US 2019/0237075 A1    Aug. 1, 2019

(30) Foreign Application Priority Data

Jan. 31, 2018  (JP) .............................. JP2018-015434

(51) Int. Cl.
*G10L 15/32* (2013.01)
*G10L 15/24* (2013.01)
*G10L 15/22* (2006.01)

(52) U.S. Cl.
CPC ........ *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,751,217 B2 * | 6/2014 | Ballinger | ............. | G06F 40/284 704/8 |
| 10,114,813 B2 * | 10/2018 | Lee | ......... | G10L 15/22 |
| 10,770,070 B2 * | 9/2020 | Jo | ........ | H04M 1/2757 |
| 2002/0032567 A1 * | 3/2002 | Lindholm | ............ | G10L 15/22 704/246 |
| 2005/0149328 A1 * | 7/2005 | Huang | ............. | G06F 3/0237 704/252 |
| 2005/0283364 A1 * | 12/2005 | Longe | ............. | G06K 9/00422 704/257 |
| 2008/0133228 A1 * | 6/2008 | Rao | ......... | G10L 15/24 704/231 |
| 2008/0162136 A1 * | 7/2008 | Agapi | ............ | G10L 15/26 704/251 |
| 2011/0010174 A1 * | 1/2011 | Longe | ............. | G10L 15/24 704/235 |
| 2016/0063998 A1 * | 3/2016 | Krishnamoorthy | ..... | G10L 15/22 704/254 |
| 2016/0313868 A1 * | 10/2016 | Weng | ..................... | H04L 67/12 |

FOREIGN PATENT DOCUMENTS

| | | |
|---|---|---|
| JP | 2000-056792 A | 2/2000 |
| JP | 2001-042996 A | 2/2001 |
| JP | 2004-234529 A | 8/2004 |
| JP | 2005-196140 A | 7/2005 |
| JP | 2007-240688 A | 9/2007 |

* cited by examiner

*Primary Examiner* — Seong-Ah A Shin
(74) *Attorney, Agent, or Firm* — Dinsmore & Shohl LLP

(57) ABSTRACT

An information processing device includes: a first reception unit configured to receive an input of one or more characters; a second reception unit configured to receive an input of voice; and a voice recognition unit configured to recognize the voice, and output a voice recognition result beginning with the one or more characters entered into the first reception unit when the second reception unit receives the input of voice with the input of the one or more characters received by the first reception unit.

4 Claims, 2 Drawing Sheets

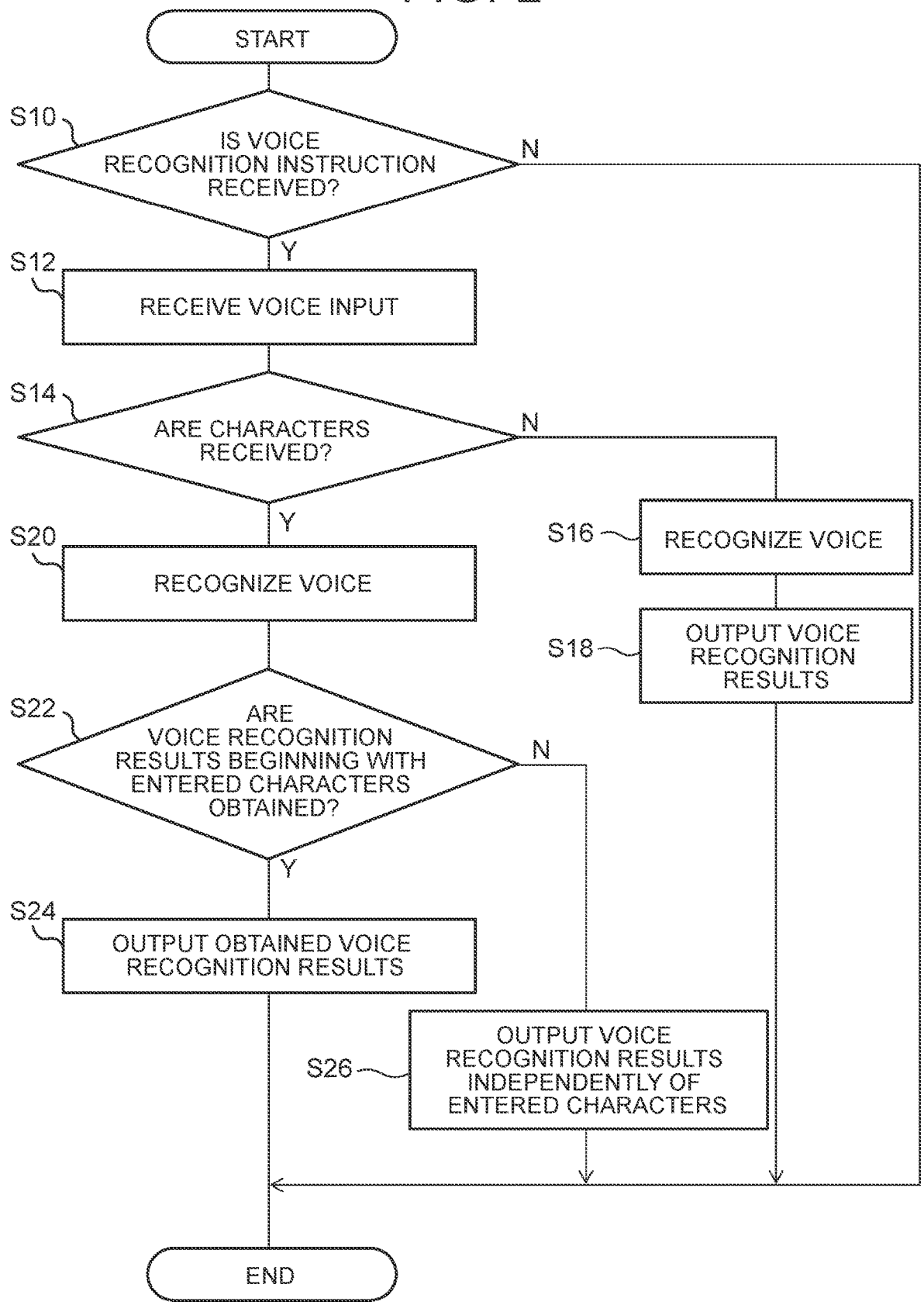

INFORMATION PROCESSING DEVICE AND INFORMATION PROCESSING METHOD

CROSS-REFERENCE TO RELATED APPLICATION

This application claims priority to Japanese Patent Application No. 2018-015434 filed on Jan. 31, 2018, including the specification, incorporated herein by reference in its entirety.

BACKGROUND

1. Technical Field

The present disclosure relates to an information processing device and an information processing method.

2. Description of Related Art

There is known a voice recognition device that selects a hierarchy level of the menu of a navigation device according to the content of a user's input to a touchpad and recognizes voices using the voice recognition dictionary prepared for that hierarchy level (for example, refer to Japanese Patent Application Publication No. 2007-240688 (JP 2007-240688 A)).

SUMMARY

In some cases, after entering desired characters using a method other than voice recognition, the user may quit entering characters in the middle and then re-enters characters using voice recognition. In this case, there is room for improving the voice recognition accuracy.

The present disclosure provides an information processing device and an information processing method that improve the voice recognition accuracy.

A first aspect of the disclosure provides an information processing device. The information processing device includes: a first reception unit configured to receive an input of one or more characters; a second reception unit configured to receive an input of voice; and a voice recognition unit configured to recognize the voice, and output a voice recognition result beginning with the one or more characters entered into the first reception unit when the second reception unit receives the input of voice with the input of the one or more characters received by the first reception unit.

According to this aspect, when an input of voice is received with an input of characters received, the information processing device outputs voice recognition results beginning with the characters entered into the first reception unit, improving the voice recognition accuracy.

In the first aspect, the information processing device may include a storage unit configured to store a voice recognition dictionary including a plurality of words. The voice recognition unit may be configured to select a specific word beginning with the one or more characters entered into the first reception unit from the plurality of words included in the voice recognition dictionary, and output the specific word as the voice recognition result.

In the first aspect, the voice recognition unit may be configured to output the voice recognition result independently of the one or more characters entered into the first reception unit, when the voice recognition result beginning with the one or more characters entered into the first reception unit is not obtained.

In the first aspect, the voice recognition unit may be configured to, when the first reception unit receives an input of a plurality of characters and when the voice recognition result beginning with the plurality of characters is not obtained, output the voice recognition result beginning with a predetermined part of characters of the plurality of characters.

In the first aspect, the predetermined part of characters may be characters excluding a last character of the plurality of characters.

A second aspect of the disclosure provides an information processing method. The information processing method includes: receiving an input of one or more characters; receiving an input of voice; recognizing the voice; and when the input of voice is received with the one or more characters received, outputting a voice recognition result beginning with the one or more characters.

According to the present disclosure, the voice recognition accuracy is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart showing the processing of the voice recognition device shown in FIG. 1.

DETAILED DESCRIPTION

First Embodiment

Figure 1:
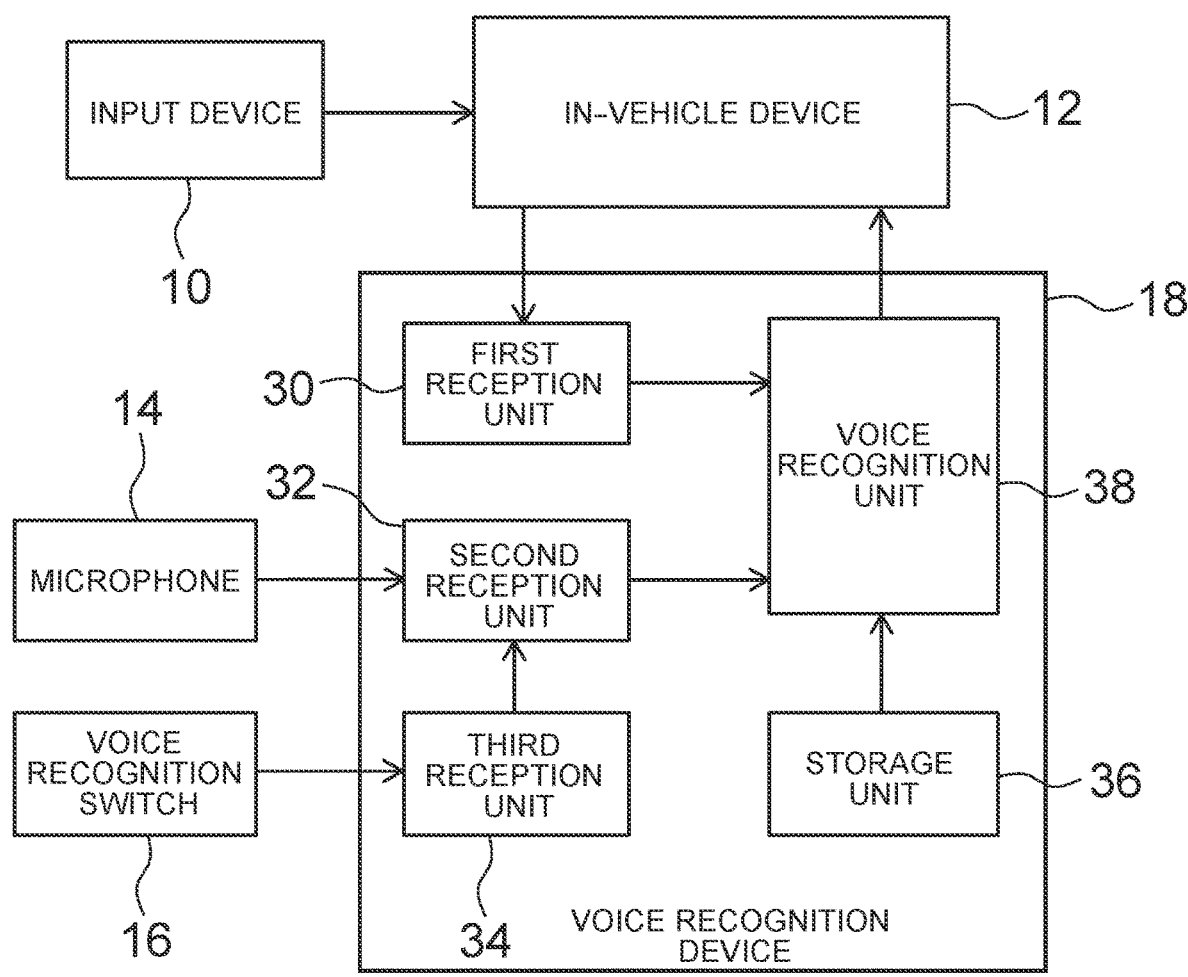
FIG. 1 is a block diagram showing a configuration of an in-vehicle system according to a first embodiment.

FIG. 1 is a block diagram showing a configuration of an in-vehicle system 1 according to a first embodiment. The in-vehicle system 1 is mounted on a vehicle. The in-vehicle system 1 includes an input device 10, an in-vehicle device 12, a microphone 14, a voice recognition switch 16, and a voice recognition device 18.

The input device 10 is a device for entering characters in response to a user operation. The input device 10 is, for example, a touchpad provided on the center console between the driver's seat and the passenger seat of a vehicle for allowing the user to perform a touch operation. The input device 10 outputs the operation signal, generated by a touch operation, to the in-vehicle device 12. With his or her wrist on the center console, the user performs the touch operation on the input device 10 while watching the display unit (not shown) on the dashboard but without looking at the input device 10. For example, the user slides his or her finger or taps the screen for entering characters or for selecting an in-vehicle function.

The input device 10 may be a touch panel provided on the display surface of the display unit for allowing the user to touch the panel or may be another input device on which the user can perform an operation to enter characters.

The in-vehicle device 12 causes the display unit to display an image related to the operation of the user based on the operation signal supplied from the input device 10. The in-vehicle device 12 is, for example, a car navigation device though not limited to it. For example, when setting a destination on the in-vehicle device 12 to obtain route guidance, the user slides his or her finger on the input device 10 to move the cursor displayed on the display unit. Then, when the user taps a position corresponding to one of a plurality of characters displayed on the display unit, the character is entered into the in-vehicle device 12. A plurality of characters are entered in this way to set the destination. Characters are entered in many situations, for example, when a personal name is entered to search for a telephone number. The in-vehicle device 12 outputs the entered character data to the voice recognition device 18.

In some cases, after manually entering some of the desired characters on the input device 10, the user may quit entering characters in the middle. For example, the user may quit entering characters because the user feels it difficult or troublesome to enter characters on the input device 10 or because the driving situation has changed. After quitting entering characters, the user re-enters characters through voice recognition. For example, when the characters to be entered are "Wanwan Park", the user enters "Wa" or "Wan" via the input device 10 and, then, quits entering characters and speaks "Wanwan park".

The microphone 14, provided in the vehicle interior, acquires the speech of the occupant of the vehicle and outputs the voice data to the voice recognition device 18.

The voice recognition switch 16, a switch operated by the user when the user desires voice recognition, is provided, for example, in the steering wheel. The voice recognition switch 16 is a pushbutton type or lever type mechanical switch. When the user presses this switch, the operation signal is output to the voice recognition device 18.

The voice recognition device 18 includes a first reception unit 30, a second reception unit 32, a third reception unit 34, a storage unit 36, and a voice recognition unit 38. The voice recognition device 18 functions as an information processing device.

The first reception unit 30 receives the input of characters from the in-vehicle device 12 and outputs the characters to the voice recognition unit 38.

The third reception unit 34 receives the operation signal from the voice recognition switch 16. Upon receipt of the operation signal, the third reception unit 34 outputs the voice recognition instruction to the second reception unit 32.

When the voice recognition instruction is output from the third reception unit 34, the second reception unit 32 receives the input of a voice from the microphone 14 for a predetermined period and outputs the voice to the voice recognition unit 38.

The storage unit 36 stores a voice recognition dictionary that includes a plurality of words. The plurality of words includes, for example, place names that may be set as the destination in the car navigation device and proper names such as person names registered in the telephone directory. The storage unit 36 may be provided in the in-vehicle device 12.

The voice recognition unit 38 recognizes a voice using a known technique when the second reception unit 32 receives an input of voice with no character received by the first reception unit 30, and outputs voice recognition results to the in-vehicle device 12. More specifically, from a plurality of words stored in the voice recognition dictionary, the voice recognition unit 38 selects words with a high degree of matching with the recognized character string and outputs the selected words to the in-vehicle device 12 as the voice recognition results.

A high degree of matching with the recognized character string means that the reliability is high. The reliability indicates the degree of possibility that a word is correctly recognized from voice data. The higher the reliability, the higher the possibility that the word is recognized correctly.

The voice recognition unit 38 outputs one or more voice recognition results whose reliability is a predetermined value or higher. The predetermined value can be appropriately set by experiment.

On the other hand, when the second reception unit 32 receives an input of voice with one or more characters entered into the first reception unit 30, the voice recognition unit 38 recognizes the voice and outputs voice recognition results, beginning with the characters entered into the first reception unit 30, to the in-vehicle device 12. More specifically, the voice recognition unit 38 selects words, beginning with the characters entered into the first reception unit 30 and having a high degree of matching with the recognized character string, from the plurality of words stored in the voice recognition dictionary and then outputs the words, selected in this manner, as the voice recognition results. The voice recognition unit 38 outputs one or more voice recognition results, whose reliability is a predetermined value or higher, to the in-vehicle device 12.

For example, assume that the characters the user wants to enter are "Wanwan park", that the characters entered into the first reception unit 30 are "Wan", that the recognized character string is "Wanwan park", and that "Wanwan park" is included in the voice recognition dictionary. In this case, "Wanwan park" is output as the voice recognition result. The characters " . . . park" beginning with characters other than "Wan" such as "Daiichi park", if included in the voice recognition dictionary, are not output as the voice recognition result. In addition, the characters beginning with "Wan" such as "Wan hotel", if included in the voice recognition dictionary, are not output as the voice recognition result if its reliability is low.

If voice recognition results beginning with the characters entered into the first reception unit 30 are not obtained, that is, if voice recognition results beginning with the entered characters and having a reliability level equal to or higher than the predetermined value are not obtained, the voice recognition unit 38 outputs voice recognition results independently of the characters entered into the first reception unit 30. That is, in this case, the voice recognition unit 38 selects words, having a high degree of matching with the recognized character string, from the plurality of words stored in the voice recognition dictionary, and outputs them as the voice recognition results. In such a case, the characters entered into the first reception unit 30 may be wrong.

The in-vehicle device 12 causes the display unit to display one or more voice recognition results, output from the voice recognition unit 38, to allow the user to select one of them. To select one of them, the user touches one of the voice recognition results on the input device 10. As a result, the selected character string, which is one of the voice recognition results, is set in the in-vehicle device 12.

This configuration can be implemented by the CPU, memory, and other LSIs of a computer on a hardware basis, and by a program loaded into the memory on a software basis. The above example shows the functional blocks that are implemented by cooperation between hardware and software. Therefore, it is understood by those skilled in the art that these functional blocks can be implemented in various forms by hardware only, by software only, or by a combination of hardware and software.

Next, the overall operation of the in-vehicle system 1 with the above configuration will be described. FIG. 2 is a flowchart showing the processing of the voice recognition device 18 shown in FIG. 1. The processing in FIG. 2 is repeated periodically.

If the voice recognition instruction is not received (N in S10), the processing is terminated. If the voice recognition instruction is received (Y in S10), the second reception unit 32 receives a voice input from the microphone 14 (S12). If the first reception unit 30 has not received characters (N in S14), the voice recognition unit 38 recognizes the voice (S16), outputs the voice recognition results (S18), and terminates the processing.

On the other hand, if the first reception unit 30 has received characters (Y in S14), the voice recognition unit 38 recognizes the voice while referring to the received characters (S20). If voice recognition results beginning with the received characters are obtained (Y in S22), the voice recognition unit 38 outputs the obtained voice recognition results (S24) and terminates the processing. If voice recognition results beginning with the received characters are not obtained (N in S22), the voice recognition unit 38 outputs voice recognition results independently of the received characters (S26) and terminates the processing.

According to this embodiment, if an input of voice is received with an input of characters received, the voice recognition device 18 outputs voice recognition results beginning with the received characters, thus improving the voice recognition accuracy while referring to the received characters.

In addition, the voice recognition device 18 selects words, beginning with the received characters, from the plurality of words stored in the voice recognition dictionary and outputs the selected words as voice recognition results, further improving the voice recognition accuracy.

In addition, if voice recognition results beginning with the entered characters are not obtained, the voice recognition device 18 outputs voice recognition results independently of the characters entered into the first reception unit 30. This makes it possible to take an appropriate action if characters are erroneously entered, providing better voice recognition results.

Second Embodiment

A second embodiment differs from the first embodiment in that, if voice recognition results beginning with a plurality of characters entered into the first reception unit 30 are not obtained, the voice recognition unit 38 outputs voice recognition results beginning with a predetermined part of characters of the plurality of characters. The second embodiment will be described below with emphasis on differences from the first embodiment.

The configuration of the in-vehicle system 1 in the second embodiment is not shown since the configuration is the same as that shown in FIG. 1. If the first reception unit 30 receives an input of a plurality of characters and if voice recognition results beginning with the plurality of characters are not obtained, the voice recognition unit 38 outputs voice recognition results beginning with a predetermined part of characters of the plurality of characters. The predetermined part of characters is, for example, the plurality of characters excluding the last one character. That is, the voice recognition unit 38 outputs voice recognition results beginning with one or more characters of the plurality of characters excluding the last one character.

For example, assume a situation in which, when the characters the user wants to enter are "Wanwan park", the user has erroneously entered the third character with the result that the characters entered into the first reception unit 30 are "Waw" and, after that, the user uses voice recognition. In this situation, if the recognized character string is "Wanwan park", if "Wanwan park" is included in the voice recognition dictionary, and if a word beginning with "Waw" is not included in the voice recognition dictionary, voice recognition results are not obtained. In this case, "Wanwan park" beginning with "Wa", which is generated by excluding the last one character "w" from the entered characters "Waw", is output as the voice recognition result.

If voice recognition results beginning with a predetermined part of characters of the plurality of characters are not obtained, the voice recognition unit 38 outputs voice recognition results independently of the entered characters.

If the first reception unit 30 receives one character and if voice recognition results beginning with the received character are not obtained, the voice recognition unit 38 outputs voice recognition results independently of the received character.

According to this embodiment, if voice recognition results beginning with a plurality of received characters are not obtained, voice recognition results beginning with a predetermined part of characters of the plurality of characters are output. In this way, this embodiment excludes a character that is likely to be erroneously entered, thus increasing the possibility that correct voice recognition results are output.

In some cases, when characters are erroneously entered into the input device 10, the user may quit entering characters. In this case, the last one character of the plurality of characters is likely to be erroneous with high probability. In this embodiment, the voice recognition unit 38 outputs voice recognition results beginning with the characters excluding the last one character of the plurality of characters. In this way, this embodiment excludes the last one character that is likely to have been erroneously entered, making it possible to output a more accurate voice recognition result.

The present disclosure has been described with reference to the embodiments. Note that the embodiments are merely an example. It is to be understood by those skilled in the art that various modifications are possible by combining the components and the processing processes and that such modifications are also within the scope of the present disclosure.

For example, in the first embodiment, if voice recognition results beginning with the characters entered into the first reception unit 30 are not obtained, the voice recognition unit 38 may notify the in-vehicle device 12 that voice recognition results are not obtained and then enter the wait state. In the second embodiment, if voice recognition results beginning with one character entered into the first reception unit 30 are not obtained or if voice recognition results beginning with a predetermined part of the plurality of characters entered into the first reception unit 30 are not obtained, the voice recognition unit 38 may notify the in-vehicle device 12 that the voice recognition results are not obtained and then enter the wait state. Upon receiving this notification, the in-vehicle device 12 notifies the user, via voice or image, that the voice could not be recognized. In these cases, the user is required to operate the voice recognition switch 16 and then speak again. When the second reception unit 32 receives an input of a new voice in response to the new voice recognition instruction, the voice recognition unit 38 recognizes the voice and outputs the voice recognition results independently of the characters entered into the first reception unit 30. This modification makes it possible to make the configuration of the voice recognition device 18 more flexible.

What is claimed is:

1. An information processing device comprising:
a first reception unit configured to receive an input of one or more characters;
a second reception unit configured to receive an input of voice;
a storage unit configured to store a voice recognition dictionary including a plurality of words; and
a voice recognition unit configured to:
  recognize the voice,
  receive the one or more characters from the first reception unit,
  select words beginning with the one or more characters entered into the first reception unit from the plurality of words included in the voice recognition dictionary,
  determine a specific word from the words beginning with the one or more characters entered into the first reception unit that matches the recognized voice,
  determine whether the specific word matches the recognized voice with a degree of reliability that is greater than a predetermined value,
  output the specific word as a voice recognition result when the degree of reliability is greater than the predetermined value, and
  output a voice recognition result independently of the one or more characters entered from the first reception unit when the degree of reliability is not greater than the predetermined value.

2. The information processing device according to claim 1, wherein
the voice recognition unit is configured to output, when the first reception unit receives an input of a plurality of characters and when the voice recognition result beginning with the plurality of characters is not obtained, the voice recognition result beginning with a predetermined part of characters of the plurality of characters.

3. The information processing device according to claim 2, wherein
the predetermined part of characters are characters excluding a last character of the plurality of characters.

4. An information processing method comprising
receiving an input of one or more characters;
receiving an input of voice;
recognizing the voice;
selecting words beginning with the one or more characters from a plurality of words included in a voice recognition dictionary,
determining a specific word from the words beginning with the one or more characters that matches the recognized voice,
determining whether the specific word matches the recognized voice with a degree of reliability that is greater than a predetermined value,
outputting, the specific word as a voice recognition result when the degree of reliability is greater than the predetermined value, and
outputting a voice recognition result independently of the one or more characters entered from a first reception unit when the degree of reliability is not greater than the predetermined value.

* * * * *